June 11, 1963 E. BARATTI 3,092,891
PRODUCTION OF MONOFILAMENTS OBTAINED FROM
HIGHLY VISCOUS ALPHA-OLEFIN POLYMERS
Filed July 27, 1959
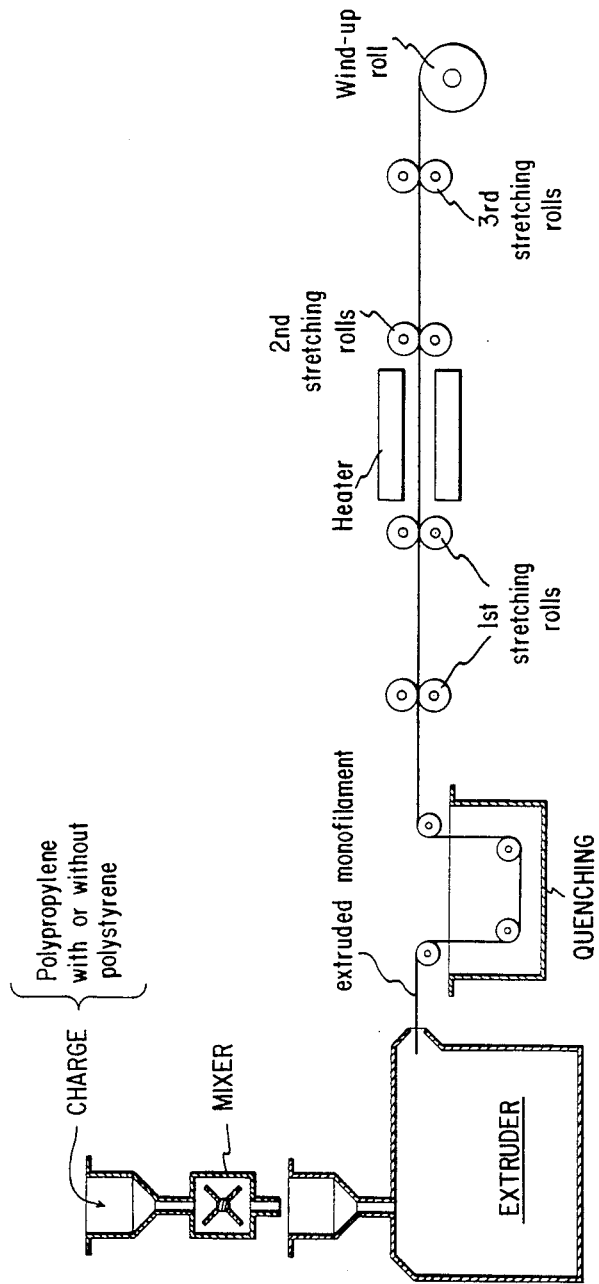
INVENTOR.
ENRICO BARATTI
BY
ATTORNEY

# 3,092,891
PRODUCTION OF MONOFILAMENTS OBTAINED FROM HIGHLY VISCOUS ALPHA-OLEFIN POLYMERS Enrico Baratti, Milan, Italy, assignor to Montecatini Societa Generale per l'Industria Mineraria e Chimica, Milan, Italy
Filed July 27, 1959, Ser. No. 829,519
Claims priority, application Italy Aug. 1, 1958
8 Claims. (Cl. 28—82)

The present invention relates to a process for the production of monofilaments derived from alpha-olefin polymers having a high intrinsic viscosity. More particularly, the invention is directed to monofilaments derived from polypropylene and from a mixture of polypropylene and polystyrene.

Alpha-olefin polymers have been described in the Journal of Polymer Science, April 19, 1955, volume XIV, Issue No. 82, pages 143–54. Furthermore, a low pressure process for the stereospecific polymerization of propylene and other higher alpha-olefins has been described by Natta et al. in Italian Patent No. 526,101, issued November 14, 1955.

In accordance with the preceding references, it has been established that various types of fibers can be obtained from alpha-olefin polymers and in particular from polypropylene. These fibers have excellent properties for a wide variety of purposes, and were derived from a polymer having a medium intrinsic viscosity. On the other hand, polymers having a very high viscosity and having high crystallinity although produced by the foregoing polymerization processes have not heretofore been generally made into fibers due to various difficulties encountered in fabrication processes, particularly in spinning and orienting. Particular poly alpha-olefins not generally amenable to fiber-making processes are crystalline propylene polymers having a very high intrinsic viscosity (above 1.8), but these same polymers, if made into oriented fibers should exhibit outstanding characteristics, such as high tenacity, high elasticity and low brittleness.

An object of the present invention is to obtain monofilaments from alpha-olefin polymers of high intrinsic viscosity.

Another object of this invention is to provide a process for the production of monofilaments derived from alpha-olefin polymers having a high intrinsic viscosity.

Another object is to provide monofilaments made of a highly viscous mixture of polypropylene and polystyrene, said monofilaments being especially suitable for brooms and the like.

Other objects and advantages of this invention will become apparent upon further study of the specification and the appended claims.

It has, in fact, been surprisingly found that, if the monofilaments obtained by extruding propylene polymers or mixtures based mainly on polypropylene are subjected to specific multi-stage stretching treatments, fibers or filaments having excellent properties can be obtained.

According to this invention, a monofilament obtained by extrusion of polypropylene with an intrinsic viscosity higher than 1.5 or of a mixture based mainly on polypropylene is subjected to a first quenching treatment and then to a multiple stretching in three stages, the entire stretching ratio being between 7:1 and 8:1. The steps must be carried out in the following manner:

QUENCHING STEP

Quick cooling of the monofilament can be obtained by placing a quenching bath at a distance of about 10 cm. from the spinneret outlet. This quenching bath can be maintained at about 20° C. in order to obtain quick cooling. Obviously, this quenching step is a heat transfer operation and other systems yielding the same result can be employed. Such variables as the diameter of the filament, the speed of filament travel, the temperature of the bath, the ambient temperature, the cooling liquid, etc. can be used to advantage by the designer.

FIRST STRETCHING STAGE

This stage is conducted at room temperature.
The stretching ratio in the first stage is from 3:1 to 5:1, and preferably 3.8:1.

SECOND STRETCHING STAGE

This stage is conducted by immersing the filament in a heat transfer medium such as water, so that the stretching is conducted at approximately the boiling temperature of water or slightly lower than 100° C. The stretching ratio is from 1.5:1 to 1.9:1, and preferably 1.7:1.

THIRD STRETCHING STAGE

This stretching stage is conducted at room temperature. The stretching ratio is in the range of about 1.1:1 to 1.2:1.

The process of the invention is shown diagrammatically in the accompanying drawing.

If the monofilament must be wound on reels after the stretching operation, it is passed directly to the winder. If, to the contrary, it must be used as brush bristles and must, therefore, be prepared in the form of pieces of various lengths, it is preferably subjected to a further treatment. This is accomplished by allowing the treated filament to stand for 24 hours, and it is then treated with steam at 110° C. for about 10 minutes in order to complete crystallization and to obtain a higher elasticity.

Only by the process of this invention is it possible to obtain polypropylene filaments having an intrinsic viscosity higher than 1.5, preferably of about 2–2.2 or even higher and which exhibit tenacities higher than 6 g./den. It has been found that by processing filaments in strict accordance with the present invention, it is possible to produce filaments having about a 20% higher tenacity than those filaments produced by all other methods. A further outstanding property of the filaments produced by this invention is that these same high tenacities are obtained with filaments having unusually high diameters in the range of from 0.30–0.40 mm. In contrast, it is established that with other polymers having even higher densities, such as nylon, much lower diameter filaments are required to yield tenacities in the range of 6 g./den.

According to another embodiment of this invention, it has been found that mixtures of polypropylene and polystyrene, when subject to a multiple stretching in three stages, under the same above-described conditions of temperature and stretching, yield filaments having an even higher hardness, a higher whiteness and a lower deformability than the corresponding unmodified polypropylene products. These filaments also exhibit high tensile strength and very high tenacity values and are therefore eminently suitable as filaments for brushes and brooms. For this purpose, they have the further advantage to the fact that they exhibit a lower deformability during their manufacture. And of even greater importance, when they are subjected to strain during use they reassume their original shape more promptly and with a higher release. The ratio of polypropylene to polystyrene is generally from 8:2 to 9.8:0.2, preferably 9:1.

Another advantage of the bristles of this invention is that "feathering" (unraveling the ends of each bristle into a small bundle of parallel filaments) is facilitated. This "feathering" softens the point of each bristle thus rendering it particularly suitable for the use in the broom field.

The monofilaments and, therefore, the bristles obtained therefrom can have a diameter of between 0.15 and 0.70 mm. Various samples of monofilaments obtained from 100% polypropylene and having a length of 98 mm. and a diameter of between 0.24 and 0.340 mm. (diameters determined in a Palmer micrometer) were tested in a motor dynamometer having a capacity of 5 to 15 kg. and a tensile rate of 50 cm. per minute, at 20° C., with a relative humidity of 69%, and showed a tensile in the range of 3.7–3.8 kg. and an elongation at break of 21–22%. In a similar manner, samples of monofilaments (23 cm. length by 0.4–0.5 diameter) obtained from a mixture of polypropylene and polystyrene were found to exhibit tensile strengths up to 6 kg. and elongation at break values up to 20%.

The following specific embodiments exemplify but do not limit the stretching process of the present invention.

*Example*

From polypropylene with an intrinsic viscosity of 2.1 and a crystallinity at the X-rays of about 90%, a monofilament having a count of 1,500 den. was prepared. This filament was then stretched, immediately after spinning, at room temperature with a stretching ratio of 1:4. The stretched filament was subsequently subjected to stretching in boiling water (98–100° C.) with a stretching ratio of 1:1.7. Finally, the filament was subjected to a third stretching treatment at room temperature with a stretching ratio of 1:1.2. The characteristics of the filament after the third stretching were as follows—

Tenacity _____ 6.2 g./den.
Elongation _____ 15 percent.
Knot strength _____ 5 g./den.

The process according to the invention is particularly suitable for polypropylene or polypropylene mixtures having a very high intrinsic viscosity, generally higher than 1.5, more particularly of about 2–2.2. It can, however, be applied—without substantial variations—also to the preparation of monofilaments obtained from polypropylene having an intrinsic viscosity lower than 1.5 e.g. of 1.3.

The polymers processed by this invention can be obtained by polymerizing propylene or styrene with the stereospecific catalysts of Natta et al. previously mentioned, wherein the polymerizates from such a process are less than 50% extractable with boiling n-heptane and the non-extractable portion is made up of isotactic macromolecules.

It is understood that the inventor intends to claim, as a part of his invention, any variation, substitution and changes that lie within the scope of the invention and the hereinafter appended claims and intends to include within the scope of said claims such changes as may be apparent to those skilled in the art in the practice of the principles of this invention and within the scope as set forth in the hereinabove-stated specification.

It will be understood that the invention is susceptible to modification in order to adapt it to different usages and conditions, and, accordingly, it is desired to comprehend such modifications within the invention as may fall within the scope of the appended claims.

I claim:

1. A process for improving the properties of melt-extruded monofilaments containing polypropylene made up prevailingly of isotactic crystallizable macromolecules non-extractable with boiling n-heptane, which comprises the steps of (1) quenching the polypropylene-containing monofilament immediately after extrusion thereof, (2) subjecting the quenched monofilament to a first stretching stage at room temperature with a stretching ratio of from 3:1 to 5:1, (3) subjecting the stretched monofilament to a second stretching stage at about 100° C. with a stretching ratio of from 1.5 to 1.9, and (4) subjecting the twice stretched monofilament to a third stretching stage at room temperature with a stretching ratio of from 1.1:1 to 1.2:1.

2. The process as described in claim 1, wherein the monofilament, in step 1, is quenched to about 20° C.

3. The process as described in claim 1, wherein the stretching ratio of step 2 is 3.8:1 and the stretching ratio of step 3 is 1.7:1.

4. A process as described in claim 1, characterized by the additional step of maintaining the thrice stretched filament from step 4 in the stretched stage for about 24 hours and then subjecting it to a steam treatment at 100° C. for approximately 10 minutes in order to complete crystallization of the isotactic macromolecules and to obtain a higher elasticity.

5. After-stretched monofilaments of polypropylene made up prevailingly of isotactic crystallizable macromolecules and having an intrinsic viscosity higher than 1.5, said filaments having a tenacity of 6.2 g./den., a knot strength not lower than 5 g./den., and diameters of about 0.30–0.40 mm., and being substantially free of areas of "necking down" along the length thereof.

6. After-stretched monofilaments of polypropylene made up prevailingly of isotactic crystallizable macromolecules and having an intrinsic viscosity of from about 2 to 2.2, said filaments having a tenacity of 6.2 g./den., a knot strength not lower than 5 g./den., and diameters of about 0.30–0.40 mm., and being substantially free of areas of "necking down" along the length thereof.

7. A bristle comprised of an after-stretched monofilament of a mixture of polypropylene made up prevailingly of isotactic, crystallizable macromolecules and polystyrene made up of isotactic, crystallizable macromolecules, said filament having a tensile strength of about 6 kg./cm.$^2$ and an elongation at break value up to 20%.

8. The bristle of claim 7, wherein the ratio of polypropylene to polystyrene is 9:1.

References Cited in the file of this patent

UNITED STATES PATENTS 2,161,766   Rugeley et al. _____ June 6, 1939

FOREIGN PATENTS 538,782     Belgium _____ Dec. 6, 1955
1,167,990   France _____ Aug. 25, 1958